United States Patent Office 3,127,399
Patented Mar. 31, 1964

3,127,399
MONO-ESTERS AND DI-ESTERS OF CYANURIC HALIDES AND METHODS OF PREPARING SAME
Lennart Albert Lundberg, Stamford, Conn., assignor to American Cyanamid Company, New York, N.Y., a corporation of Maine
No Drawing. Filed Aug. 14, 1959, Ser. No. 833,702
5 Claims. (Cl. 260—248)

The present invention relates to the preparation of new triazine derivatives and a novel method of preparing same. In particular, the instant discovery concerns the preparation of new and useful alkenyloxy-halo-s-triazines.

According to the present invention alkenyloxy-dihalo-s-triazines conforming to the Formula I

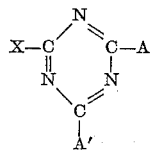

wherein X is a halogen, A is OR, R being a monovalent radical which is the residue of a primary, ethylenically-unsaturated monohydric alcohol containing from 3 to 10 carbon atoms, and A′ is halogen, are prepared by bringing into intimate contact under substantially anhydrous conditions at a temperature in the range of 60° C.–110° C. a cyanuric halide, a primary, ethylenically-unsaturated monohydric alcohol, and an alkali bicarbonate in an inert, water-immiscible medium, such as benzene, in which the cyanuric halide and the alcohol reactants are miscible.

For example, a mixture of cyanuric chloride, $C_3N_3Cl_3$, allyl alcohol, and sodium bicarbonate in benzene is heated to a temperature of about 80° C. until reaction has taken place, a benzene-$H_2O$-alcohol azeotropic mixture being taken over substantially as formed. The resulting product mixture is filtered and the filtrate distilled to remove any benzene and unreacted alcohol remaining, thus recovering relatively-pure product residue identified as allyloxy-dichloro-s-triazine.

Reaction is considered to have taken place when the evolution of $CO_2$ ceases, i.e., when the $NaHCO_3$ is neutralized. At that point heating may be discontinued and the product recovered as just indicated.

It is obvious from the above that the process contemplated herein is not only straightforward but the results achieved are totally unexpected. By virtue of the prior art teachings it would be expected that all the halogen sites of the cyanuric halide reactant, such as cyanuric chloride and cyanuric bromide, would be attacked and converted. On the contrary, in the generous range of conditions disclosed herein the mono-ester of cyanuric halide is produced in very generous yields.

Still another surprising element of the present invention is the fact that the art teaches against the use of sodium bicarbonate. U.S. Patent No. 2,537,816 specifically states that $NaHCO_3$ is ineffective in an analogous reaction.

The reactants and reaction media mentioned above may be brought together in a variety of sequences. For example, all the components, save the unsaturated primary alcohol, may be mixed together and the alcohol introduced therein in varying increments or continuously. If desired, also, all the reactants may be mixed together prior to or while heating.

The reactions contemplated herein may be carried out at temperatures in the range of 60° C. to 110° C., preferably at about the reflux temperature of the azeotrope formed. For example, benzene the preferred azeotroping agent or inert medium refluxes at about 80° C. when azeotroped with $H_2O$ and allyl alcohol. Other azeotroping agents or liquid hydrocarbons having a boiling point below 150° C., such as xylene and toluene, form azeotropic mixtures with $H_2O$ and allyl alcohol which reflux at temperatures higher than 80° C. Generally, therefore, temperatures in the range of 60° C. to 110° C. are best suited for the present reaction.

The process contemplated herein may be carried out at atmospheric, sub-atmospheric or super-atmospheric pressure. Likewise, the process may be continuous, semi-continuous or batch.

It has been found that the alkali bicarbonate, such as sodium bicarbonate, potassium bicarbonate, lithium bicarbonate, ammonium bicarbonate, should be present in a molar ratio of at least about 1.2 to 1, bicarbonate to cyanuric halide. However, almost any practical excess of bicarbonate is contemplated herein.

The molar ratio of unsaturated primary alcohol to cyanuric halide, on the other hand, is generally at least 1:1; however, the former component may be present in substantial excess, based on the cyanuric halide.

Among the many unsaturated primary alcohols contemplated herein are allyl, methallyl, ethallyl, propallyl, 2-butenyl, 3-butenyl, 3-methyl-2-butenyl, 3-methyl-3-butenyl, 2-pentenyl, 3-pentenyl, 4-pentenyl, 2-methyl-2-pentenyl, 3-methyl-4-pentenyl, 2-hexenyl, 1,3-pentadienyl, 2,4-hexadienyl, 2-octenyl, 3-nonenyl, 2-decenyl, etc.

The inert media contemplated herein and which have been described hereinabove as miscible with the cyanuric halide and alcohol reactants should also be such that they do not react with these reactants under the conditions given herein.

Pursuant to the instant discovery, also, the reaction is carried out under substantially anhydrous conditions to prevent the production of undesirable derivatives, particularly the hydrolysis of the halogen sites on the cyanuric halide reactant. While the presence of only small amounts of $H_2O$ in the reaction mixture is generally tolerable and is readily removed by the azeotroping agent without hindering the reaction, it is preferred to operate under substantially anhydrous conditions.

Still another feature of the present invention is the fact that the alkenyloxy-dihalo-s-triazines (I) produced as taught herein may, in turn, be reacted with further primary, ethylenically-unsaturated alcohols and an alkali bicarbonate in the substantial absence of liquid hydrocarbons, or the like, i.e., under non-azeotroping conditions, to produce the corresponding dialkenyloxy-halo-s-triazines in which A′ is OR, R being the monovalent radical of said alcohol reactant. See Example II, infra.

Surprisingly enough, the dialkenyloxy-derivative is not formed when the azeotroping agents contemplated herein are present. Therefore, not only is an unprecedented and clearcut process for producing alkenyloxy-dihalo-s-triazines in good yields provided by the instant discovery, but an equally clearcut method for converting the alkenyloxy-dihalo-s-triazines to dialkenyloxy-halo-s-triazines has been found.

In the production of dialkenyloxy-derivatives an even wider range of temperatures, generally from 10° C. to 110° C., is contemplated. Preferably, however, temperatures in the range of 60° C. to 90° C. are best suited.

The reactants are usually present in the ratio of at least about 1 mole of primary, ethylenically-unsaturated alcohol and at least about 1 mole of alkali bicarbonate, respectively, per mole of alkenyloxy-dihalo-s-triazine reactant. Preferably, at least about a 50 percent by weight excess, even as high as 100 to 1000 percent or more, of the alcohol reactant is present, thus providing a liquid medium for the reaction.

The alkali bicarbonate may or may not be in excess. A slight practical excess of up to about 20 percent by weight or more is usually employed.

As in the case of the process described hereinabove for making alkenyloxy-dihalo-s-triazines, production of the corresponding dialkenyloxy-halo-s-triazine derivatives may be carried out at various pressures and using various mixing sequences.

Since the inert medium, such as benzene, is readily removed upon completing the reaction to produce the alkenyloxy-dihalo-s-triazines of the present invention, it is unnecessary to separate and recover the product from the product mixture as described in Example I, infra, before treating the alkenyloxy-dihalo-s-triazine contained therein with further alcohol and alkali bicarbonate to produce the corresponding dialkenyloxy-halo-s-triazine derivative. An in situ preparation is therefore within the purview of the instant discovery.

The following examples best illustrate the present invention:

EXAMPLE I

*Allyloxy-Dichloro-s-Triazine*

Cyanuric chloride (555 grams or 3 moles), allyl alcohol (261 grams or 4.5 moles), sodium bicarbonate (30.2 grams or 3.6 moles) and benzene (900 grams) are admixed and heated to reflux. Water is collected azeotropically over a 6 hour period, i.e., until evolution of $CO_2$ gas ceases, 62.5 grams of water-alcohol mixture being removed. The resulting hot slurry is filtered to remove sodium chloride formed and any unreacted cyanuric chloride. The clear filtrate thus formed is then concentrated under vacuum (i.e. about 20 millimeters (mercury) pressure) to give 543 grams of a liquid residue. This residue is cooled and subjected to a second filtration in which a small amount of solid (7.5 grams of cyanuric chloride) is removed. The thus-purified filtrate is then distilled under vacuum at 1.5 millimeters (mercury) pressure. Upon distilling, a forerun is collected containing a trace of cyanuric chloride (27 grams). A second liquid fraction is then collected which amounts to 412 grams of allyloxy-dichloro-s-triazine, representing a 66.4 percent by weight yield based upon the yield theoretically producible. The product has a boiling point of 74.5° C.–76° C. at 0.18 millimeter (mercury) pressure.

*Analysis.*—Calculated for C, 34.95; H, 2.43; Cl, 34.40. Found: C, 35.26; H, 2.61; Cl, 33.60.

EXAMPLE II

*Diallyloxy-Chloro-s-Triazine*

Allyloxy-dichloro-s-triazine (51.5 grams or 0.25 mole) prepared as described in Example I, above, is admixed with allyl alcohol (130.2 grams or 2.5 moles) and sodium bicarbonate (21 grams) or 0.25 mole) and heated for 5 hours at a temperature of 87° C.–90° C. The resulting reaction mixture is filtered to remove sodium chloride and the filtrate stripepd of unreacted allyl alcohol and water under vacuum (water aspirator). The residue is then distilled to give 38.5 grams or 68 percent by weight of theory of liquid distillate product diallyloxy-chloro-s-triazine having a boiling point of 98.5° C.–108.5° C. at 0.2 milli-meter (mercury) pressure. Upon redistillation of the liquid product 25.5 grams of water-white product liquid is collected having a boiling point of 104° C.–105.5° C. at 0.3 millimeter (merucry) pressure.

*Analysis.*—Calculated for: C, 47.47; H, 4.40; N, 18.46; Cl, 15.60. Found: C, 48.60; H, 4.87; N, 18.43; Cl, 15.31.

EXAMPLE III

*Allyloxy-Dichloro-s-Triazine*

| Components | Mole | Grams |
|---|---|---|
| 1. Cyanuric chloride | 5 | 925 |
| 2. Allyl alcohol | 7.5 | 435 |
| 3. Sodium bicarbonate | 6 | 504 |
| 4. Trichloroethylene | | 1,500 |

While heating a mixture of components 1,3 and 4 at slow reflux (86° C.), component 2 is added thereto dropwise over a six-hour period. Water is collected azeotropically and a total of 90.5 milliliters of water-allyl alcohol mixture is thus separated. Heating is then continued for two hours, at the end of which period liberation of carbon dioxide has practically ceased. The resulting reaction mixture is then filtered, concentrated and distilled essentially as described in Example I, above. About 591.5 grams of liquid product allyloxy-dichloro-s-triazine boiling between 70.5–78° C. at 0.1 millimeter (mercury) pressure is thus produced.

EXAMPLE IV

*Octenyloxy-Dibromo-S-Triazine*

| Components | Mole | Grams |
|---|---|---|
| 1. Cyanuric bromide | 1.0 | 317.7 |
| 2. Octenyl alcohol | 1.5 | 373.0 |
| 3. $KHCO_3$ | 1.2 | 120.0 |
| 4. Cyclohexane | | 600.0 |

Octenyl alcohol is slowly added to a slurry consisting of components 1, 3 and 4 at reflux temperature (80.8° C.). Upon completing the addition of octenyl alcohol (2.5 grams), the resulting reaction mixture is heated for an additional 1.5 hours and effluent removed therefrom as formed, water being a major component thereof. The resulting hot reaction mixture is filtered, the filtrate cooled and product octenyloxy-dibromo-s-triazine recovered.

The trisubstituted-s-triazines (esters) contemplated herein are active herbicides, fungicides and nematocides. They may be used as sprays in organic solvents, as emulsions in water or other non-solvents, or on solid carriers, such as talcs, diatomaceous earths, and the like.

The marked activity of the esters is illustrated as follows (all percentages given as percent by weight, unless otherwise indicated):

TABLE I

Seeds

| Allyloxy-dichloro-s-triazine (Percent Concentration) | Diallyloxy-chloro-s-triazine (Percent Concentration) | Wheat, Percent Kill* | Radish, Percent Kill* |
|---|---|---|---|
| 0.1 | | 100 | 100 |
| 0.01 | | 100 | 100 |
| | 0.1 | 100 | 100 |
| | 0.01 | 100 | 88 |

*Numerical percentage.

TABLE II
*Fungi*

| Allyloxy-dichlori-s-triazine (Percent Concentration) | Diallyloxy-chloro-s-triazine (Percent Concentration) | *Sclerotinia fructigena,* Percent Kill* | *Stemphylium sarcinaeforme,* Percent Kill* |
|---|---|---|---|
| 0.01 | ---------- | 100 | 100 |
| ---------- | 0.01 | 100 | 100 |

*Numerical percentage.

TABLE III
*Nematodes*

| Allyloxy-dichloro-s-triazine (Percent Concentration) | Diallyloxy-chloro-s-triazine (Percent Concentration) | Vinegar Eelworm, Percent Kill* |
|---|---|---|
| 0.1 | ---------- | 100 |
| ---------- | 0.1 | 98 |

*Numerical percentage.

Referring to Table I, a water suspension of the triazine is prepared (concentration given in the table) and seeds admixed therewith. Subsequently, the seeds are removed and germinated.

Referring to Table II, a similar suspension is prepared only spores are substituted for the seeds and germination is observed, if any.

Referring to Table III, vinegar eelworm nematodes, Anguilla sp., are kept in intimate contact with an aqueous solution of the test compound for twenty hours. The kill is as recorded in Table III.

Other azeotroping agents of the type contemplated herein and useful as inert media are: chlorinated hydrocarbons, such as bromodichloromethane, trichloroethylene, 3-iodopropene, chlorobenzene, and the like; alicyclic hydrocarbons, such as cyclohexane and 1,3-cyclohexadiene; and other similar media, such as n-hexane, allyl ether, and the like, which under the conditions given herein form azetropic mixtures with unreacted primary, ethylenically-unsaturated alcohols and water.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:
1. A method of preparing trisubstituted-s-triazines having the formula

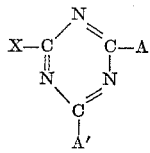

wherein X is halogen, A is OR, R being a monovalent radical which is the residue of a primary, ethylenically-unsaturated monohydric alcohol having from 3 to 10 carbon atoms and A' is halogen, which comprises bringing into intimate contact under substantially anhydrous conditions and at a temperature in the range of 60° C. to 110° C. a cyanuric halide, a primary, ethylenically-unsaturated monohydric alcohol containing from 3 to 10 carbon atoms, and an alkali bicarbonate in an inert, water-immiscible agent in which the cyanuric halide and the alcohol are miscible, which agent likewise forms an azeotropic mixture with water and an unreacted primary, ethylenically-unsaturated monohydric alcohol having from 3 to 10 carbon atoms.

2. A method of preparing allyloxy-dichloro-s-triazine which comprises bringing into intimate contact under substantially anhydrous conditions and at a temperature in the range of 60° C. to 110° C. cyanuric chloride, allyl alcohol, and sodium bicarbonate in an inert, water-immiscible agent in which the cyanuric chloride and allyl alcohol are miscible, which agent likewise forms an azeotropic mixture with water and an unreacted primary, ethylenically-unsaturated monohydric alcohol having from 3 to 10 carbon atoms, and recovering the resulting allyloxy-dichloro-s-triazine.

3. A method which comprises (a) bringing together into intimate contact under substantially anhydrous conditions and at a temperature in the range of 60° C. to 110° C. a cyanuric halide, a primary, ethylenically-unsaturated monohydric alcohol having from 3 to 10 carbon atoms, and an alkali bicarbonate in an inert, water-immiscible agent in which the cyanuric halide and the alcohol are miscible, which agent likewise forms an azeotropic mixture with water and an unreacted primary, ethylenically-unsaturated monohydric alcohol having from 3 to 10 carbon atoms, to produce a trisubstituted-s-triazine having the formula

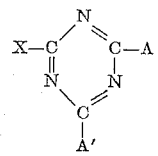

wherein X is halogen, A is OR, R being a monovalent radical which is the residue of a primary, ethylenically-unsaturated alcohol having from 3 to 10 carbon atoms and A' is halogen; reacting said trisubstituted-s-triazine with a primary, ethylenically-unsaturated alcohol having from 3 to 10 carbon atoms, and an alkali bicarbonate, at a temperature in the range of 10° C. to 110° C. and in the substantial absence of said agent, above, and recovering the corresponding trisubstituted-s-triazine in which A' is OR, R being the monovalent radical of said alcohol reactant.

4. A method of preparing diallyloxy-chloro-s-triazine which comprises bringing into intimate contact allyloxy-dichloro-s-triazine, allyl alcohol, and sodium bicarbonate at a temperature in the range of 10° C. to 110° C. and in the substantial absence of an azeotroping agent and recovering the resulting diallyloxy-chloro-s-triazine.

5. The process of claim 1 in which the inert, water-immiscible agent has a boiling point below about 150° C.

References Cited in the file of this patent
UNITED STATES PATENTS 2,513,264    Holm-Hansen _____ June 27, 1950
2,537,816    Dudley _____ Jan. 9, 1951

OTHER REFERENCES

Dudley et al.: Journ. of the Am. Chem. Soc., vol. 73, pp. 2986–2990, 1951.

MacArdle: The Use of Solvents in Synthetic Organic Chemistry, pp. 8–9, New York, 1925, D. Van Nostrand Co.

Durrans: Solvents, pp. 78–81, 7th ed., revised, D. Van Nostrand Co., New York, 1957.